Patented July 21, 1936

2,047,972

UNITED STATES PATENT OFFICE 2,047,972

CELLULOSE DERIVATIVE COMPOSITION

Walter E. Lawson, Wilmington, Del., assignor to E. I. du Pont de Nemours & Company, Wilmington, Del., a corporation of Delaware No Drawing. Original application October 17, 1930, Serial No. 489,483. Divided and this application March 26, 1932, Serial No. 601,449

12 Claims. (Cl. 106—37)

This invention relates to new compositions, and more particularly, to coating and plastic compositions containing a film forming ingredient and an ether of a six carbon atom aliphatic hexahydric alcohol, in which at least one of the hydroxyl hydrogen atoms is replaced by a univalent hydrocarbon radical. This application is a division of applicant's copending application Serial No. 489,483, filed October 17, 1930, "Sorbitol ethers and compositions containing them."

An object of this invention is the preparation of new compositions of matter, such as coating and plastic composition, comprised of these ethers. Other objects of the invention will be apparent from the description given hereinafter.

These objects are accomplished according to the present invention by the use of an ether of a six carbon atom aliphatic hexahydric alcohol, in which at least one of the hydroxyl hydrogen atoms is replaced by a univalent hydrocarbon radical, as a softener in plastic or coating compositions containing a film forming ingredient. More specifically, these objects are accomplished by the use of an alkyl or aryl ether of sorbitol as a softener in plastic and coating compositions containing a film forming ingredient selected from the group comprising cellulose derivatives, such as cellulose nitrate, acetate, or benzyl cellulose, resins, such as synthetic polyvinyl resins or meta styrene, and film forming oils, with or without solvents, diluents, pigments, and the like.

Sorbitol, which may be prepared by the reduction of glucose, is readily soluble in water but is only slightly soluble in hydrocarbons and various other solvents and diluents used in plastic compositions and coating compositions, such as lacquers. These properties make sorbitol of little value for use as a softener or plasticizer in coating and plastic compositions. It has been found that it is possible to prepare ethers of sorbitol and other six carbon atom aliphatic hexahydric alcohols having properties widely different from that of sorbitol or the other alcohols and that such ethers are practically insoluble in water but are soluble in organic solvents for use in coating and plastic compositions, making these ethers of great value for this purpose.

The replacement of hydroxyl groups in sorbitol with ether groups (alkoxy or aryloxy groups) yields products which are soluble in lacquer solvents but which are much less soluble in water than is sorbitol. The number of hydroxyl groups which it is necessary to replace with ether groups to secure products substantially insoluble in water is dependent upon the particular ether groups introduced. For example, the introduction of phenoxy groups is more effective in producing water insolubility than is the introduction of methoxy groups.

The following examples are given to illustrate the preparation of these ethers suitable for use in the compositions of the present invention:—

*Example 1.*—A mixture of 250 g. crude sorbitol, 400 g. ethyl chloride, 248 g. sodium hydroxide, 40 g. water, and 550 g. benzene was heated in a nickel autoclave with stirring for five hours at 140–155° C. When the mixture reached room temperature, it was removed from the autoclave and filtered. The residue obtained in the filtration was washed twice with about 75 cc. of benzene. The benzene layer of the filtrate and the benzene solution obtained by extracting the water layer with 250 cc. of benzene were combined and heated on a steam bath to remove the benzene, ethyl chloride, and the volatile products of the reaction. This left the sorbitol ether as a viscous, brown liquid. Analysis showed that the product averaged 2.7 ethyl groups per molecule.

*Example 2.*—A mixture containing 350 g. sorbitol, 1483 g. ethyl chloride, 920 g. sodium hydroxide, 100 g. water, and 2000 g. benzene was heated with stirring in an autoclave for four hours at 145–155° C. The benzene solution obtained by filtering the reaction mixture and washing the residue with benzene as in the preceding example was refluxed over absorbent charcoal for a short time and filtered. The filtrate, which was much lighter in color than the original benzene solution, was heated on a steam bath to remove the solvents. The ethyl sorbitol obtained in this way was a light reddish-brown, viscous liquid weighing 345 g. Analysis showed that the product averaged 4.6 ethyl groups per molecule.

*Example 3.*—A mixture of 182 g. sorbitol, 630 g. crotyl chloride, 320 g. sodium hydroxide, 50 g. water, and 600 g. benzene was heated in an autoclave with stirring for four hours at 145–150° C. When the sorbitol ether was separated as in Example 2, 220 g. of light brown, viscous liquid was secured. Analysis indicated that the product averaged 3.8 crotyl groups per molecule.

*Example 4.*—A mixture of 200 g. sorbitol containing about 15% water, 900 g. benzyl chloride, 300 g. sodium hydroxide, 60 g. water, and 300 g. xylene was heated with stirring at 130–140° C. for 6 hours. The mixture was then filtered. When the filtrate was subjected to fractional distillation at 15 mm. until a temperature of 275° C. was reached, about 300 g. xylene and 584 g. benzyl chloride were recovered and 34 g. benzyl alcohol, 35 g. dibenzyl ether, and 122 g. of dark, viscous residue were obtained. The residue was dissolved in 200 cc. of a benzene-alcohol mixture and heated on a steam bath with 25 g. absorbent charcoal for three hours. This mixture was filtered and the solvent was removed from the filtrate by evaporation. The benzyl sorbitol obtained as a viscous residue was light brown in color. Analysis indicated that the product consisted largely of the monobenzyl ether of sorbitol.

It will be obvious that the method for the preparation of sorbitol ethers outlined in the preceding examples is capable of considerable variation and it is to be understood that the present invention is not limited to the use of sorbitol ethers prepared as above. Instead of the alkyl or aryl halides, other esterification or etherification agents may be used, such as the alkyl or aryl sulphates.

When low-boiling halides are used, such as ethyl chloride, the reaction is carried out with pressure. Furthermore, the constituents of the reaction mixture may be varied considerably; for example, the percentage of diluent may be increased or decreased or the diluent may be omitted entirely. The alkyl or aryl halides may serve as the diluents. The pressure and the period of heating are governed largely by the boiling point and reactivity of the halide employed. Alkyl sulfates may be used in place of the halides.

It is to be understood that the general method employed in the examples is not restricted to the preparation of the particular ethers cited, but is also applicable to the preparation of other alkyl and aryl ethers. Moreover, it is not limited to the production of simple ethers; mixed ethers may be prepared by reacting sorbitol with two or more halides, for examples, with a mixture of ethyl and crotyl chlorides.

The present invention is concerned with those ethers of six carbon atom aliphatic hexahydric alcohols in which the organic group replacing a hydrogen atom of a hydroxyl group of the alcohol is a univalent hydrocarbon radical as distinguished from hydrocarbon radicals which are not univalent, as for instance, hydroxy alkyl or hydroxy aryl radicals.

While I prefer to use sorbitol for the production of my improved softening agent, other six carbon atom hexahyldric alcohols, such as mannitol, dulcitol, and othed stero isomers of sorbitol may be used. These ethers, and especially those of sorbitol, possess properties which make them of value as softeners or plasticizers for coating and plastic compositions. They have lower vapor pressures than the corresponding ethers derived from alcohols having a lesser number of hydroxyl groups, and this characteristic, coupled with their stability, and easy solubility in lacquer solvents, render these compounds especially valuable as plasticizing agents. They may be used with cellulose derivatives, such as cellulose nitrate, cellulose acetate, ethyl cellulose, and benzyl cellulose; and with natural and synthetic resins. Sorbitol ethers may also be used in compositions containing oils, pigments, and other lacquer ingredients. Films containing sorbitol ethers as plasticizers are flexible and have satisfactory durability.

The following examples show the use of my new plasticizing agents in coating compositions containing cellulose derivative and other lacquer ingredients. Parts are given by weight:—

*Example 5*

| | Parts |
|---|---|
| Cellulose nitrate | 12 |
| Ethyl sorbitol from Ex. 2 | 7 |
| Chrome orange | 9 |
| Damar | 9 |
| Toluene | 30 |
| Ethyl acetate | 20 |
| Butyl acetate | 5 |
| Butyl alcohol | 8 |

*Example 6*

| | Parts |
|---|---|
| Cellulose acetate | 10 |
| Triethyl sorbitol | 3 |
| Toluene | 51 |
| Ethyl acetate | 9 |
| Cellosolve | 9 |
| Cellosolve acetate | 9 |
| Butyl alcohol | 9 |

*Example 7*

| | Parts |
|---|---|
| Cellulose nitrate | 10 |
| Crotyl sorbitol from Ex. 3 | 5 |
| Ethyl acetate | 40 |
| Butyl acetate | 12 |

*Example 8*

| | Parts |
|---|---|
| Cellulose nitrate | 10 |
| Benzyl sorbitol from Ex. 4 | 3 |
| Ethyl acetate | 25 |
| Butyl acetate | 17 |
| Xylene | 9 |

*Example 9*

| | Parts |
|---|---|
| Benzyl cellulose | 10 |
| Benzyl sorbitol from Ex. 4 | 3 |
| Ethyl acetate | 40 |
| Benzene | 10 |
| Butyl acetate | 20 |

*Example 10*

| | Parts |
|---|---|
| Cellulose nitrate | 12 |
| Benzyl sorbitol from Ex. 4 | 7 |
| Ester gum | 5 |
| Zinc oxide | 15 |
| Toluene | 30 |
| Ethyl acetate | 20 |
| Butyl acetate | 5 |
| Butyl alcohol | 6 |

Examples of my improved softening agents and vinyl resins are illustrated in the following three examples. Parts are given by weight:—

*Example 11*

| | Parts |
|---|---|
| Meta styrene | 20 |
| Ethyl sorbitol from Ex. 2 | 6 |
| Toluene | 24 |

*Example 12*

| | Parts |
|---|---|
| Alpha polymer of vinyl chloride | 10 |
| Crotyl sorbitol from Ex. 3 | 3 |
| Ethyl acetate | 25 |
| Butyl acetate | 15 |

*Example 13*

| | Parts |
|---|---|
| Polymerized vinyl acetate | 10 |
| Benzyl sorbitol from Ex. 4 | 3 |
| Ethyl acetate | 16 |
| Butyl acetate | 8 |

The softening agents disclosed herein are also useful in plastic compositions from which molded articles are produced.

The following example is illustrative of a composition of this character containing benzyl sorbitol as a plasticizer, gypsum as a filler, carbon as a pigment and benzyl cellulose as a binder.

*Example 14*

Twenty-five parts benzyl cellulose and 5 parts benzyl sorbitol from Example 4 were dissolved in a mixture of 15 parts alcohol and 15 parts benzene and then added to 45 parts gypsum and 1 part carbon black. This composition was mixed on a hot plate until all the solvent was removed. The homogeneous product obtained in this way was molded at 160° C. and 1,200 pounds pressure. The molded article obtained had satisfactory strength and excellent gloss.

An advantage of the present invention resides in the fact that products of different properties, for example, products having different solubilities and compatibilities can be prepared from sorbitol by varying the etherification reagent employed and by regulating the extent of etherification. It will thus be seen that by the present invention a wide field of highly useful softening agents has been opened to the art.

As many apparently widely different embodiments of this invention may be made without departing from the spirit and scope thereof, it is to be understood that the invention is not limited to the specific embodiments thereof except as defined in the appended claims.

I claim:

1. A composition comprising a cellulose derivative and an ether of a six carbon atom aliphatic hexahydric alcohol in which at least one of the hydroxyl hydrogen atoms is replaced by a univalent hydrocarbon radical.

2. A composition comprising a cellulose derivative and an alkyl ether of a 6 carbon aliphatic hexahydric alcohol.

3. A composition comprising a cellulose derivative and an aryl ether of a 6 carbon aliphatic hexahydric alcohol.

4. A composition comprising a cellulose derivative and an ether of sorbitol in which at least one of the hydroxyl hydrogen atoms is replaced by a univalent hydrocarbon radical from the group consisting of alkyl and aryl radicals.

5. A composition comprising a cellulose derivative and an alkyl ether of sorbitol.

6. A composition comprising a cellulose derivative and an aryl ether of sorbitol.

7. A composition comprising a cellulose derivative and an ethyl ether of sorbitol.

8. A composition comprising a cellulose derivative and a benzyl ether of sorbitol.

9. A composition comprising cellulose nitrate and an alkyl ether of sorbitol.

10. A composition comprising cellulose nitrate and an ethyl ether of sorbitol.

11. A composition comprising a cellulose ether and a benzyl ether of sorbitol.

12. A composition comprising benzyl cellulose and a benzyl ether of sorbitol.

WALTER E. LAWSON.